FRANKLIN N. DRAPER & AARON DANISON.
Improvement in Carriage Wheels.
No. 119,082. Patented Sep. 19, 1871.
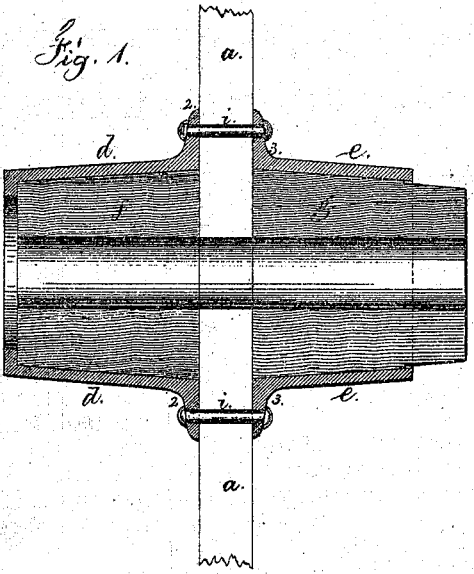
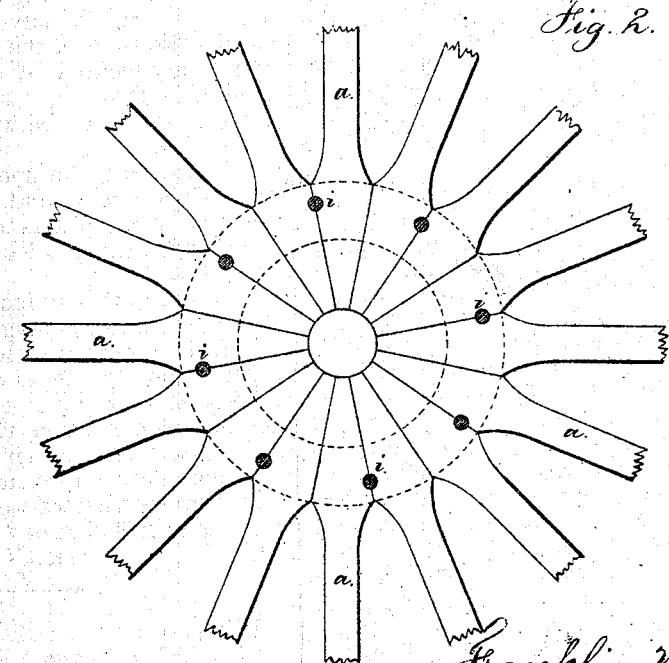
Franklin N. Draper,
Aaron Danison,
Witnesses:
Chas. H. Smith
Harold Serrell
Lemuel W. Serrell
atty

UNITED STATES PATENT OFFICE.

FRANKLIN N. DRAPER AND AARON DANISON, OF WEST LIBERTY, OHIO.

IMPROVEMENT IN CARRIAGE-WHEELS.

Specification forming part of Letters Patent No. 119,082, dated September 19, 1871.

*To all whom it may concern:*

Be it known that we, FRANKLIN N. DRAPER and AARON DANISON, of West Liberty, in the county of Logan and State of Ohio, have invented an Improvement in Carriage-Wheels; and the following is declared to be a correct description of the same.

A carriage-wheel has been made in which the inner ends of the spokes are beveled to the line of the radiuses of the circles so as to wedge together within the two-part hub, and this two-part hub was made of hollow metallic shells with annular flanges that served to clamp the wooden spokes at each side. In this character of hub the wooden blocks that fill the shell and receive the pipe of the axle are inserted from the outer ends of the shells and are liable to become loose from shrinkage, and there is not any opportunity to wedge them in firmly; besides this, the spokes are held at their sides only by the metal of the shells.

Our invention is made for removing the objectionable features in the aforesaid wheel. The metallic shells of our hub are tapering, being largest at the inner end, and into these wooden plugs are driven so as to be very firmly wedged into the shells, and with their inner ends slightly projecting, so that, when applied at opposite sides of the spokes (that set together as aforesaid) and firmly connected by bolts or rivets, the wooden spokes are clamped between the ends of said wooden plugs as well as by the flanges that surround the metallic shells. In this manner the spokes are more firmly clamped and less liable to work loose, because the wooden surfaces come together, and there is no metallic inward flange or ring that is liable to interfere with the boring out of the hub or the insertion of the metallic pipe or axle-box.

In the drawing, Figure 1 is a longitudinal section of the hub, and Fig. 2 is a side view of the spokes as they are brought together at their inner ends.

The spokes $a\ a$ are made with wedge-formed ends, so as to set together upon the radiuses of a circle, as aforesaid. The metallic shells $d$ and $e$ are made tapering, with external flanges 2 and 3 at their larger ends. The shell $d$ may have an inward flange, 4, to strengthen the hub at the inner end. The tapering plugs $f$ and $g$ are forced into the shells $d$ and $e$, as aforesaid, and there may be a feather upon the inside of each shell to prevent the plugs turning around. The plug $g$ should extend beyond the shell $e$ to receive the band or collar usually applied to a hub at the outer end. These halves of the hub are placed at opposite sides of the inner ends of the spokes and firmly secured by rivets or bolts $i\ i$. It is preferable that these rivets pass through holes bored at the joint between the spokes, as seen in Fig. 2.

By clamping the spokes firmly between the ends of the plugs $f$ and $g$ and the flanges 2 and 3 a very strong hub is made, the expense is lessened, and the risk of looseness from shrinkage is avoided.

Wooden dowels or pins might be passed through the spokes into the plugs $f$ and $g$.

We claim as our invention—

The tapering metallic shells $d$ and $e$, made largest at their inner ends and with flanges 2 and 3, in combination with the tapering plugs $f$ and $g$ inserted as specified, and the spokes set together and clamped in the manner set forth.

In witness whereof we have hereunto set our signatures this 27th day of July, A. D. 1871.

FRANKLIN N. DRAPER.
AARON DANISON.

Witnesses:
M. FAULKNER,
R. N. JORDAN.

(22.)